US006307575B1

(12) United States Patent
Matsushita

(10) Patent No.: US 6,307,575 B1
(45) Date of Patent: Oct. 23, 2001

(54) DISPLAY UNIT HAVING A SCREEN ADJUSTMENT FUNCTION

(75) Inventor: Kazuaki Matsushita, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/328,365

(22) Filed: Jun. 9, 1999

(30) Foreign Application Priority Data

Jun. 9, 1998 (JP) .................................. 10-160328

(51) Int. Cl.⁷ .................................. G09G 5/00; G09G 5/34
(52) U.S. Cl. .................... 345/788; 345/126; 345/127; 348/581; 348/583
(58) Field of Search ..................... 348/581, 583, 348/569, 131–132, 194–191; 345/121, 342, 127–131, 184, 10–11, 132, 115, 6, 439

(56) References Cited

U.S. PATENT DOCUMENTS

| 3,577,120 | * | 5/1971 | Sherbert ........................... 340/27 |
| 4,631,583 | * | 12/1986 | Paul ................................. 358/125 |
| 4,823,303 | * | 4/1989 | Terasawa ......................... 365/521 |
| 5,010,324 | * | 4/1991 | Yamamoto ....................... 345/127 |
| 5,073,771 | * | 12/1991 | Satta et al. ..................... 340/721 |
| 5,596,689 | * | 1/1997 | Tamura et al. ................. 395/133 |
| 5,714,972 | * | 2/1998 | Tanaka et al. ................. 345/121 |
| 5,751,283 | * | 5/1998 | Smith .............................. 345/342 |
| 5,828,351 | * | 10/1998 | Wu .................................. 345/11 |
| 5,852,431 | * | 12/1998 | Ito .................................. 345/145 |
| 5,896,130 | * | 4/1999 | Tsuchiya et al. ............... 345/327 |
| 5,912,663 | * | 6/1999 | Cheng ............................. 345/184 |
| 5,963,266 | * | 10/1999 | Fujimori ......................... 348/511 |
| 5,986,638 | * | 11/1999 | Cheng ............................. 345/145 |
| 5,990,940 | * | 11/1999 | Hashimoto et al. ............ 348/184 |
| 6,084,565 | * | 7/2000 | Kiya ................................ 345/115 |

FOREIGN PATENT DOCUMENTS

| 57-105778 | 7/1982 | (JP) . |
| 62-186370 | 8/1987 | (JP) . |
| 1-292398 | 11/1989 | (JP) . |
| 7-162750 | 6/1995 | (JP) . |
| 8-186774 | 7/1996 | (JP) . |
| 9-116825 | 5/1997 | (JP) . |
| 9-127903 | 5/1997 | (JP) . |

* cited by examiner

*Primary Examiner*—Andrew Faile
*Assistant Examiner*—Ngoc Vu
(74) *Attorney, Agent, or Firm*—Foley & Lardner

(57) ABSTRACT

A display unit has an on-screen-display (OSD) control block for controlling display of OSD patterns on a screen together with a main image. The screen adjustment of the display unit is effected by a dedicated switch for effecting enlargement/reduction or movement of the effective screen area on the screen. The OSD control block enlarges/reduces or moves the OSD pattern by responding to the enlargement/reduction or movement of the effective screen area, thereby providing a visual scale for the enlargement etc. of the screen during the screen adjustment.

6 Claims, 3 Drawing Sheets

DISPLAY UNIT HAVING A SCREEN ADJUSTMENT FUNCTION

BACKGROUND OF THE INVENTION (a) Field of the Invention

The present invention relates to a display unit having a screen adjustment function and, more particularly, to a display unit having a screen adjustment function for enlarging/reducing the effective size and moving the effective area of the screen of the display unit.

Display units having an on-screen-display (OSD) function are used in recent days, wherein desired characters and/or patterns are additionally displayed on a desired location of the screen of the display unit while superimposed with a main image. In a conventional display unit with or without an OSD function, when the display unit is subjected to an initial screen adjustment, an increase or decrease in numerical values or an expansion or contraction in bar charts are generally used for showing the amount of operation upon depression of a dedicated push button for enlargement/reduction or movement of the effective screen area in the vertical or horizontal directions.

In the initial screen adjustment, the intensity (brightness) control for the display unit is effected substantially without any dissatisfaction of the operator due to the feasibility of observation of amount of the operation on the screen simply by observing the screen. On the other hand, the movement or enlargement/reduction of the effective screen area in the initial screen adjustment generates dissatisfaction by the operator because the amount of operation represented by the numerical value does not effectively provide perception of the amount of operation for the enlargement etc.

SUMMARY OF THE INVENTION

It is therefore an object of the present invention to provide a display unit which is capable of providing excellent perception of the amount of enlargement/reduction or movement operation during a screen adjustment of the display unit by using a known OSD function for this purpose.

The present invention provides a display unit including a screen for displaying an image on an effective screen area of the screen, a screen adjustment block for adjusting the effective screen area on the screen, and an on-screen-display (OSD) control block for displaying an OSD pattern on the screen, the OSD control block controlling the OSD pattern by responding to adjustment of effective screen area by the screen adjustment block.

In accordance with the display unit of the present invention, the amount of movement or enlargement/reduction of the screen area in a screen adjustment can be easily observed or perceived by the movement or enlargement/reduction of the OSD pattern, thereby providing useful information for the screen adjustment.

The above and other objects, features and advantages of the present invention will be more apparent from the following description, referring to the accompanying drawings.

PREFERRED EMBODIMENTS OF THE INVENTION

Now, the present invention is more specifically described with reference to accompanying drawings.

Figure 1:
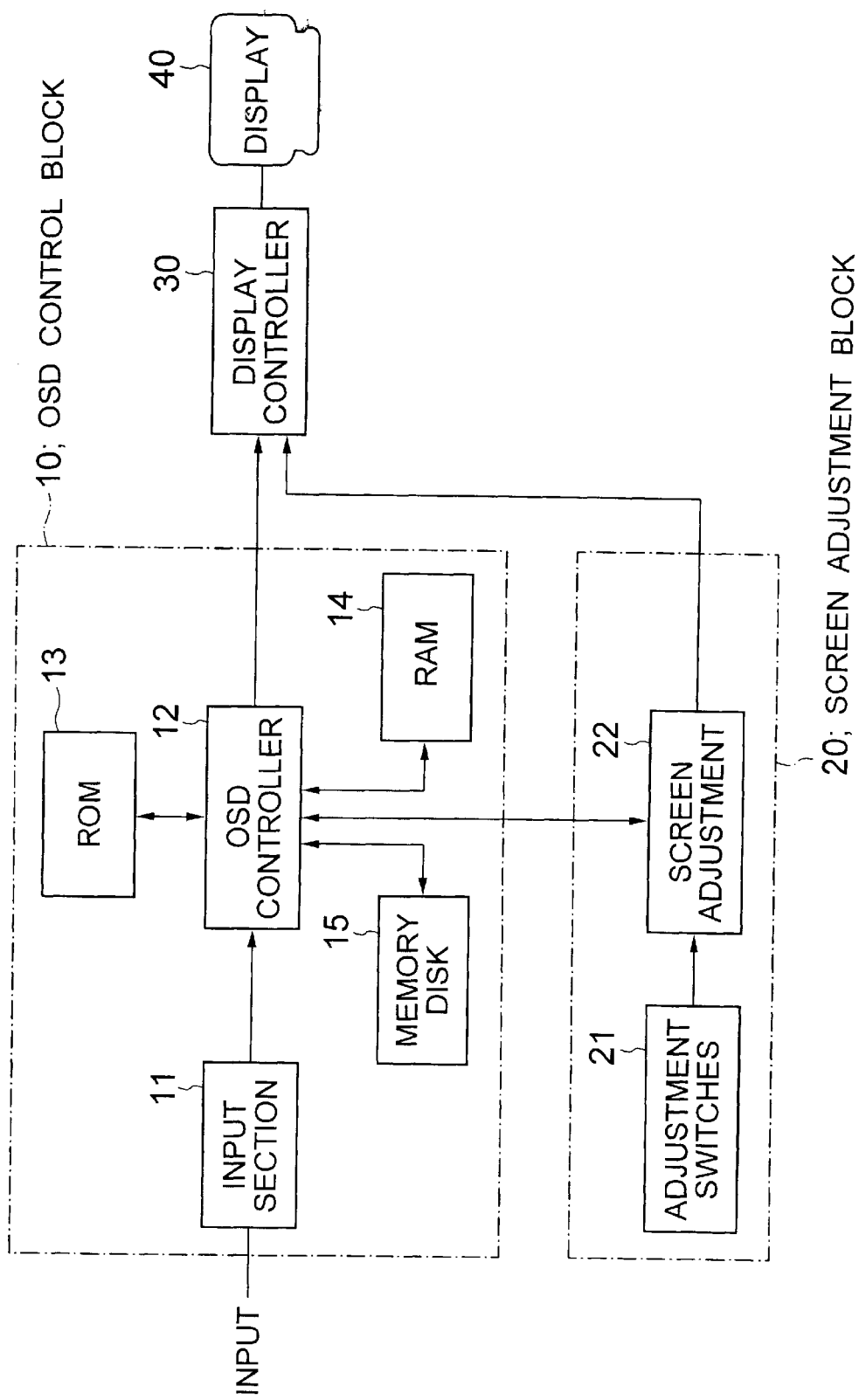
FIG. 1 is a block diagram of a display unit according to an embodiment of the present invention.

Referring to FIG. 1, a display unit according to a first embodiment of the present invention includes a screen 40 having a variable effective screen area thereon, an OSD control block 10 for generating and controlling an OSD pattern on the screen 40, a screen adjustment block 20 for controlling the effective screen area of the screen 40, and a display controller 30 for controlling the screen 40 based on the signals from the OSD control block 10 and the screen adjustment block 20.

The OSD control block 10 includes an input section 11 for receiving input signals from an operator or other input devices for the OSD function, an OSD controller 12 for responding to the inputs supplied through the input section 11 to control the OSD function, a ROM 13 for storing therein standard characters and/or patterns (simply referred to as patterns hereinafter) having respective standard sizes, a RAM 14 for temporarily storing data used by the OSD controller 12, a memory disk 15 for storing data for the OSD controller 12 during on- and off-states of the display unit. The OSD controller 12 has functions for specifying one or more of the OSD patterns displayed on the screen 40 based on the instructions supplied from the input section 11, and enlarging/reducing in the size, moving in the horizontal and/or vertical directions, and rotating or revolving the specified one or more of the OSD patterns.

The screen adjustment block 20 includes a plurality of switches 21 and a screen adjustment section 22, for controlling the effective screen area on the screen 40 based on the depression of a selected one of the switches 21. The screen adjustment includes enlargement/reduction of the size of the effective screen area, and movement of the effective screen area in the horizontal and/or vertical directions, to obtain a desired image area on the screen 40 of the display unit. The switches 21 for effecting the screen adjustment also control the OSD controller 12 through the screen adjustment section 22 for controlling the OSD pattern displayed on the screen 40, if the operator selects this mode of the screen adjustment.

Figure 2:
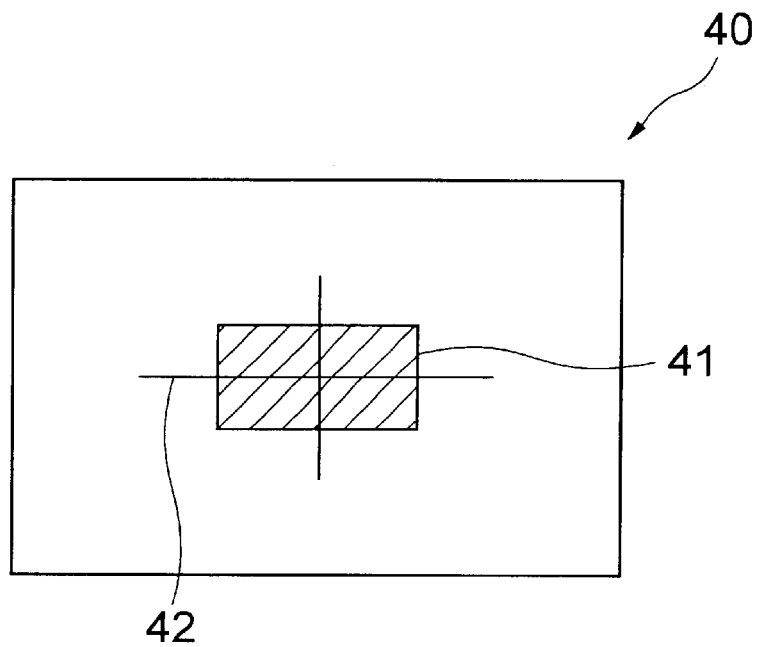
FIG. 2 is a schematic front view of the screen of the display unit of FIG. 1.

Referring to FIG. 2, there is shown an OSD pattern displayed in a pattern area 41 on the screen 40 of the display unit of FIG. 1. The pattern area 41 on the screen 40 is moved in the horizontal direction in this example by using the OSD function as well as the screen adjustment function.

Specifically, when a screen adjustment is desired by an operator, a specified pattern is first displayed on the screen 40 by using the OSD function. The pattern area 41 including therein the OSD pattern is then specified by using the OSD function at the central area of the screen 40. The pattern area 41 is attached with a reticle 42, which is specified at the center of the screen 40 in an initial adjustment of the display unit upon delivery thereof. The pattern area 41 is preferably determined as a default for the screen adjustment.

One of the switches 21 for the screen adjustment is then depressed to move the effective screen area to the right. In this operation, the OSD pattern area 41 as well as the pattern therein is moved together with the effective screen area with respect to the screen 40 of the display unit. If a desired effective screen area is obtained during the switch depression, the switch depression is finished.

Figure 3:
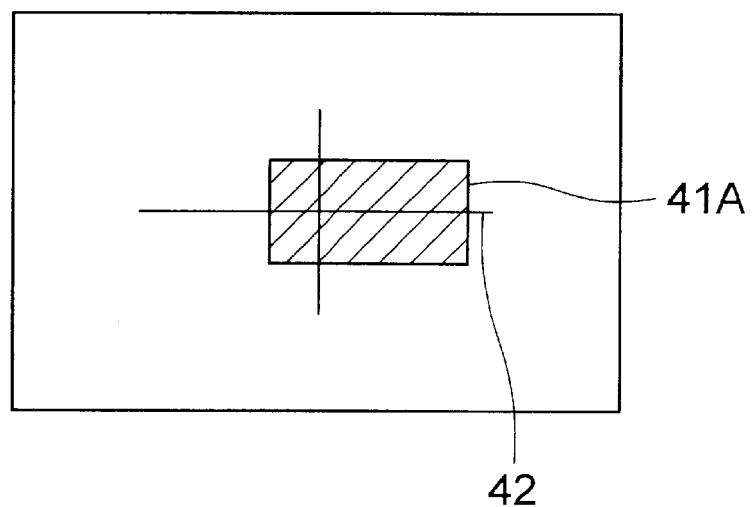
FIG. 3 is another schematic front view of the screen of the display unit of FIG. 1 after movement of the effective screen area.

Referring to FIG. 3 showing the pattern area 41A on the screen 40 after a movement of the effective screen area in the screen adjustment, the pattern area 41A deviates from the reticle 42 to visually illustrate the amount of the movement of the effective screen area. In this configuration, the screen adjustment can be conducted while observing the deviation of the pattern area 41A with respect to the reticle 42. After the desired screen area is obtained, operator finally selects the obtained screen area by releasing the switch. Then, the memory disk 15 of the OSD control block 10 stores the amount of deviation of the pattern area 41A with respect to the reticle 42. When the display unit is turned on for a next time, the OSD control block 10 determines the location of the effective screen area based on the operation of the precedent screen adjustment.

On the other hand, if the operator wishes to restore the original location of the effective screen area before the adjustment, the OSD control block 10 restores the original location of the effective screen area 41 upon request from the operator based on the amount of deviation stored in the memory disk 15.

Figure 4:
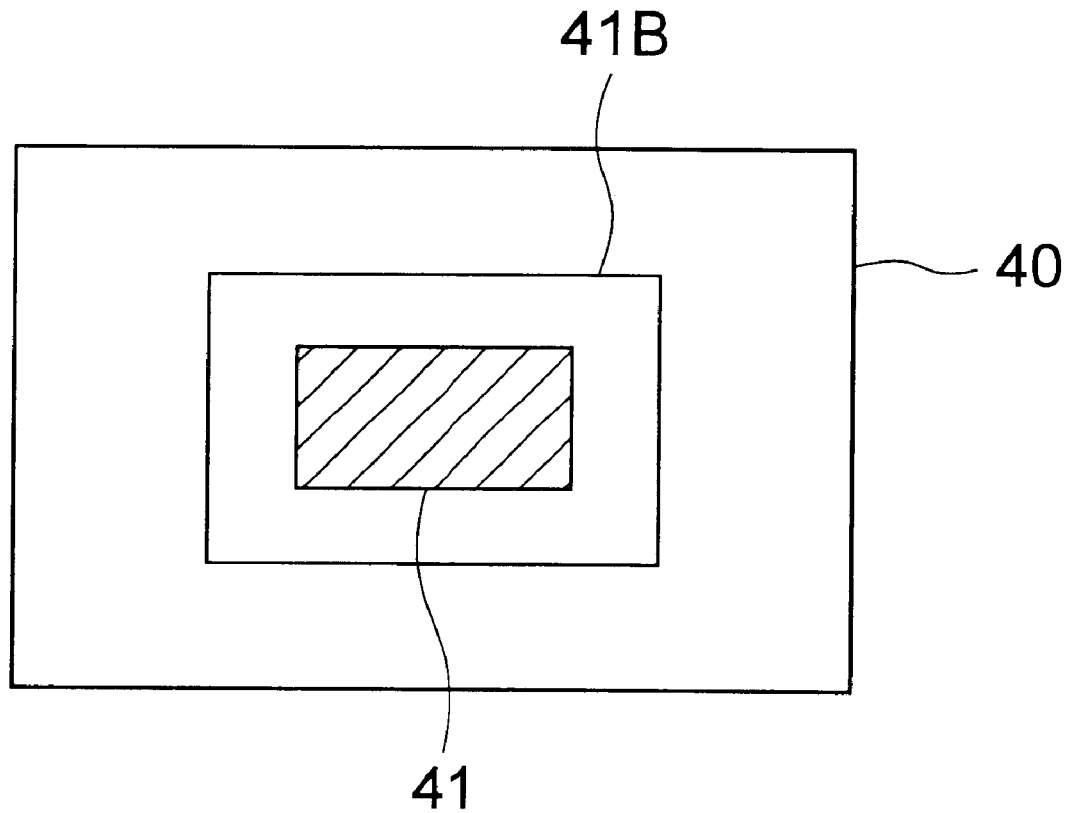
FIG. 4 is another schematic front view of the screen of the display unit of FIG. 1 after enlargement of the effective screen area.

Referring to FIG. 4, there is shown another pattern area 41B after enlargement of the effective screen area. When the screen adjustment is effected to enlarge the screen size, the reticle 42 on the screen 40 in FIG. 2 is replaced or added by an original image of the pattern area 41 before enlargement. Thus, the enlargement of the screen size can be visually observed from the current size of the pattern area 41B compared with the size of the original pattern area 41. A numerical value for the enlargement ratio defined as the ratio of the current size to the original size of the pattern area may be additionally displayed on the screen 40. The numerical value for the enlargement ratio is stored in the memory disk 15 for the next turn-on of the display unit.

Since the above embodiment is described only for an example, the present invention is not limited to the above embodiment and various modifications or alterations can be easily made therefrom by those skilled in the art without departing from the scope of the present invention.

What is claimed is:

1. A display unit comprising:
   a screen having an effective screen area for displaying an image on the effective screen area,
   a screen adjustment block for adjusting the effective screen area of said screen, and
   an on-screen-display (OSD) control block for displaying an OSD pattern corresponding to the effective screen area on said screen, said OSD control block controlling said OSD pattern by responding to an adjustment of the effective screen area by said screen adjustment block.

2. The display unit as defined in claim 1, wherein said OSD control block enlarges/reduces or moves said OSD pattern corresponding to an enlargement/reduction or movement of said effective screen area by said screen adjustment block.

3. The display unit a s defined in claim 1, wherein said OSD control block displays a reticle in addition to said OSD pattern.

4. The display unit as defined in claim 1, wherein said OSD control block displays an original image of said OSD pattern as well as a current image of said OSD pattern after enlargement/reduction of said OSD pattern.

5. The display unit as defined in claim 4, wherein an enlargement/reduction ratio is additionally displayed on said screen.

6. The display unit as defined in claim 1, wherein said OSD pattern is separate as a pattern area from another area.

* * * * *